United States Patent [19]
Song

[11] Patent Number: 5,633,787
[45] Date of Patent: May 27, 1997

[54] SWITCH-MODE POWER SUPPLY WITH CONTROL OF OUTPUT SUPPLY VOLTAGE AND OVERCURRENT

[75] Inventor: Ui H. Song, Kyungi-do, Rep. of Korea

[73] Assignee: Samsung Electro-Mechanics Co., Ltd., Kyungki-do, Rep. of Korea

[21] Appl. No.: 505,736

[22] Filed: Jul. 21, 1995

[30] Foreign Application Priority Data

Jul. 21, 1994 [KR] Rep. of Korea ............ P94-17598

[51] Int. Cl.$^6$ ........................... H02M 3/335
[52] U.S. Cl. ........................... 363/21; 363/41; 363/50; 363/80
[58] Field of Search ............ 363/21, 50, 56, 363/78, 80, 97, 131

[56] References Cited

U.S. PATENT DOCUMENTS 3,777,253 12/1973 Callan ................... 323/22 T
5,297,014 3/1994 Saito et al. ................. 363/21
5,412,555 5/1995 Uramoto ................... 363/18

*Primary Examiner*—Peter Wong
*Assistant Examiner*—Shawn Riley
*Attorney, Agent, or Firm*—Lowe, Price, LeBlanc & Becker

[57] ABSTRACT

A switch-mode power supply which can simplify its circuit construction and reduce its size and manufacturing cost by achieving output supply voltage control and prevention of overcurrent using a single circuit. The switch-mode power supply includes first and second supply voltage conversion sections for converting an input AC supply voltage in a switching mode, and a control section which senses a converted output supply voltage and an output supply current according to the converted output supply voltage provided from the second supply voltage conversion section to provide a control signal corresponding to the sensed voltage and current. The control section is coupled to the first supply voltage conversion section and controls the operation of the first supply voltage conversion section according to the control signal.

9 Claims, 3 Drawing Sheets

SWITCH-MODE POWER SUPPLY WITH CONTROL OF OUTPUT SUPPLY VOLTAGE AND OVERCURRENT

BACKGROUND OF THE INVENTION

1. Field of the Invention

The present invention relates to a switch-mode power supply (SMPS), and more particularly to an SMPS with control of its output supply voltage and overcurrent which can simplify its construction and reduce its manufacturing cost.

2. Description of the Prior Art

Typically, an SMPS may be classified into a constant-voltage type SMPS and a constant-current type SMPS. In the constant-voltage type SMPS, a commercial AC supply voltage is converted into a DC supply voltage by rectification and filtering, and the DC supply voltage is converted into a rectangular waveform voltage of a high frequency by means of a semiconductor power-switching element. The rectangular waveform voltage is then applied to a primary winding of a transformer having a predetermined turn ratio, and a DC supply voltage is obtained by rectifying and filtering a waveform voltage developed in a secondary winding of the transformer. In the constant-current type SMPS, the AC supply current is converted into the DC supply current through a constant-current type power supply.

A prior art SMPS is illustrated in FIG. 1. Referring to FIG. 1, the prior art SMPS includes an output supply voltage control section 10, an overcurrent control section 20 and a driving voltage generating section 30.

Referring again to FIG. 1, the prior art SMPS also includes a transformer T1 whose primary winding is coupled to a power supply input terminal Vin, rectifying diodes D1 and D2 for rectifying the voltage developed in a secondary winding of the transformer T1, a coil L1 and a capacitor C2 for smoothing the unregulated DC supply voltage provided from the rectifying diodes D1 and D2 to provide the smoothed DC output supply voltage Vo to a load RL.

The output supply voltage control section 10 comprises resistors R1 and R2 for dividing the output supply voltage Vo, a shunt regulator SR1, whose reference voltage terminal Vref is connected to the connection point of the resistors R1 and R2, for stabilizing the output supply voltage, and a first photodiode PD for feeding an output supply voltage control signal back to the primary winding of the transformer T1 in accordance with the output voltage through a resistor R9 and the output voltage of the shunt regulator SR1. The photodiode PD constitutes a photocoupler.

The overcurrent control section 20 comprises a sensing resistor Rs for sensing the output supply current, an operational amplifier OP1 coupled between both terminals of the sensing resistor Rs through resistors R4 and R5, and a second photodiode PD2, which constitutes another photocoupler, for providing an overcurrent control signal to the primary winding of the transformer T1, being turned on or off according to the output signal of the operational amplifier OP1.

As shown in FIG. 1, the supply voltage Vcc2 is applied to the anode of the second photodiode PD2 through a resistor 8. In a normal current state, the supply voltage Vcc2 is applied to the non-inverting terminal of the operational amplifier OP1 through a resistor R6.

The driving voltage generating section 30 comprises an additional secondary winding of the transformer T1 having a predetermined number of turns, a diode D3 for rectifying the voltage induced in the additional secondary winding, and a regulator 31 for regulating the rectified voltage to provide a predetermined supply voltage Vcc2 for driving the operational amplifier OP1 in the overcurrent control section 20.

The prior art SMPS is also provided with a first phototransistor PT1 of the photocoupler which is turned on by the light generated by the photodiode PD in the output supply voltage control section 10, a second phototransistor PT2 of the other photocoupler which is turned on by the light generated by the photodiode PD2 in the overcurrent control section 20, a pulse width modulation (PWM) section 11 whose output duty cycle varies when either of the first and second phototransistors is turned on, and a switching transistor Q1 whose on/off time is controlled according to the output duty cycle of the PWM section 11 and which switches the input supply voltage Vin to the primary winding of the transformer T1.

The operation of the prior art SMPS as constructed above will now be explained.

The input supply voltage Vin is applied to the primary winding of the transformer T1 under the control of the switching transistor Q1. The voltage developed in the secondary winding is rectified by the diodes D1 and D2 and then smoothed by the coil L1 and the capacitor C1 to be provided to the load RL as the DC output supply voltage Vo.

The supply voltage Vo is divided by the resistors R1 and R2, and the divided voltage is then applied to the reference voltage terminal Vref of the shunt regulator SR1.

At this time, if the output supply voltage Vo is relatively low, the level of the reference voltage terminal Vref of the shunt regulator SR1 becomes less than 2.5 V. This causes the current flowing through the first photodiode PD of the photocoupler to become lesser.

If the output voltage of the shunt regulator SR1 falls below the reference level, the impedance of the first phototransistor PT1 increases, so that the voltage Vc supplied to the PWM section 11 increases. This results in increase of the output duty cycle of the PWM section 11. If the duty cycle of the PWM section 11 increases, the on-time of the following switching transistor Q1 also increases, resulting in increase of the output supply voltage Vo.

Meanwhile, if the output supply voltage Vo is relatively high, the level of the reference voltage terminal Vref of the shunt regulator SR1 rises above 2.5 V, and this causes the current flowing through the first photodiode PD of the photocoupler to become greater.

Accordingly, when the output voltage of the shunt regulator SR1 rises above the reference level, the impedance of the first phototransistor PT1 decreases, so that the voltage supplied to the PWM section 11 decreases. This results in decrease of the output duty cycle of the PWM section 11. If the duty cycle of the PWM section 11 decreases, the on-time of the switching transistor Q1 also decreases, resulting in decrease of the output supply voltage Vo.

The overcurrent control section 20 determines whether overcurrent flows and controls the overcurrent by comparing the current flowing though the sensing resistor Rs in the overcurrent control section 20 with a predetermined value. That is, in a normal state, the current I flowing through the sensing resistor Rs becomes less than the reference current Iref.

Accordingly, the input voltage Ve of the operational amplifier OP1 becomes higher than "0" level by the combination of the resistors R6, R5 and R4, and thus the current flowing through the photodiode PD2 of the photocoupler decreases. As a result, the impedance of the second phototransistor PT2 increases, causing the voltage being provided to the PWM section 11 to be kept unchanged.

Meanwhile, if overcurrent flows, that is, if the current I through the sensing resistor becomes larger than the reference current Iref, the input voltage Ve of the operational amplifier OP1 becomes lower than "0" level, causing the current flowing through the photodiode PD2 of the photocoupler to increase.

Accordingly, the impedance of the second phototransistor PT2 decreases, and this causes the voltage being provided to the PWM section 11 to decrease, resulting in decrease of the output duty cycle of the PWM section 11. If the duty cycle of the PWM section 11 decreases, on-time of the transistor Q1 also decreases, resulting in decrease of the output supply voltage Vo and the output supply current. Thus, overcurrent is prevented.

The voltage developed in the additional secondary winding of the transformer T1, which has a predetermined number of turns, is rectified by the diode D3 and then regulated by the regulator 31 to be provided to the operational amplifier OP1 as its driving power supply Vcc2.

However, the prior art SMPS of FIG. 1 has the drawback that it has a complicated structure since the output supply voltage control section and the overcurrent control section are separately designed. Further, its size and manufacturing cost increase since the power supply for driving the operational amplifier in the overcurrent control section should be provided by means of the driving voltage generating section including the additional winding of the transformer.

SUMMARY OF THE INVENTION

The present invention has been made to solve the above-mentioned problems. It is an object of the present invention to provide a switch-mode power supply with control of output supply voltage and overcurrent which can simplify its circuit construction and reduce its manufacturing cost by achieving output supply voltage control and prevention of overcurrent with a single circuit using one photocoupler.

It is another object of the present invention to provide a switch-mode power supply with control of output supply voltage and overcurrent which can reduce its size by requiring no additional secondary winding of the transformer and by providing its driving supply voltage utilizing its own output supply voltage.

In order to achieve the above objects, there is provided a switch-mode power supply having a switch-mode supply voltage conversion means for converting an input AC supply voltage into a DC supply voltage, the power supply comprising:

a first supply voltage conversion means for controlling applying of said input AC supply voltage to said switch-mode supply voltage conversion means;

a second supply voltage conversion means for providing a converted supply voltage corresponding to a signal applied by said first supply voltage conversion means; and a control means having a sensing means, coupled to said second supply voltage conversion means, for simultaneously sensing a converted output supply voltage level from said second supply voltage conversion means and an output supply current according to said converted output supply voltage level, said control means sensing said converted output supply voltage and said output supply current simultaneously or separately and providing a control signal corresponding to said converted output supply voltage and said output supply current, said control means being coupled to said first supply voltage conversion means and controlling said first supply voltage conversion means according to said control signal.

It is preferable that the switch-mode power supply according to the present invention further comprises a supply voltage generating means for providing a stabilized driving supply voltage to said control means by rectifying and smoothing said converted supply voltage provided from said second supply voltage conversion means.

BRIEF DESCRIPTION OF THE DRAWINGS

The above objects and other features of the present invention will become more apparent by describing the preferred embodiments thereof with reference to the accompanying drawings, in which.

DETAILED DESCRIPTION OF THE PREFERRED EMBODIMENT

The following is the detailed description of the preferred embodiments of the switch-mode power supply circuit, according to the present invention, which functions to control the output supply voltage and to prevent overcurrent, with relevant drawings.

Figure 1:
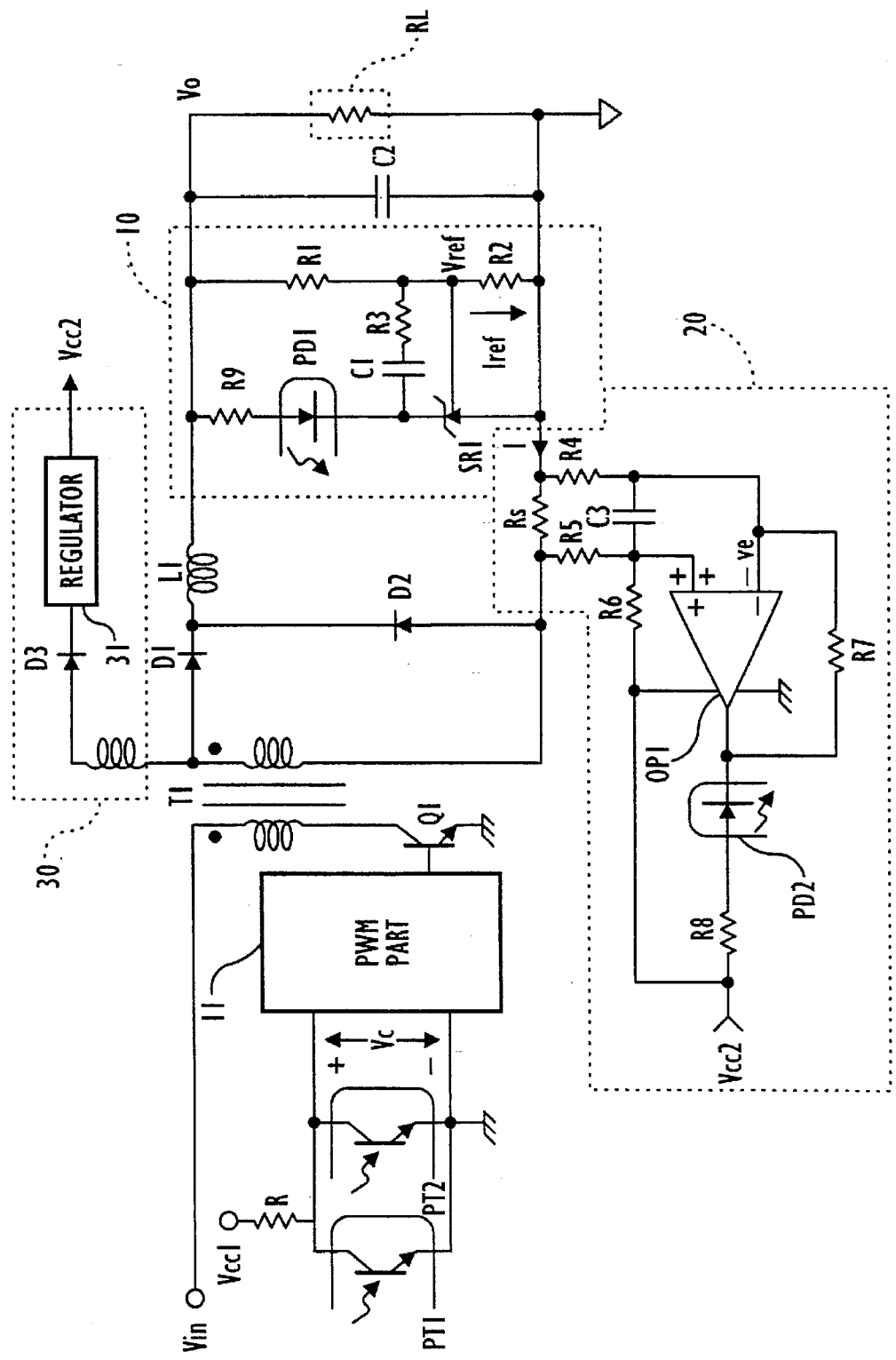
FIG. 1 is a circuit diagram illustrating a prior art SMPS.
Figure 2:
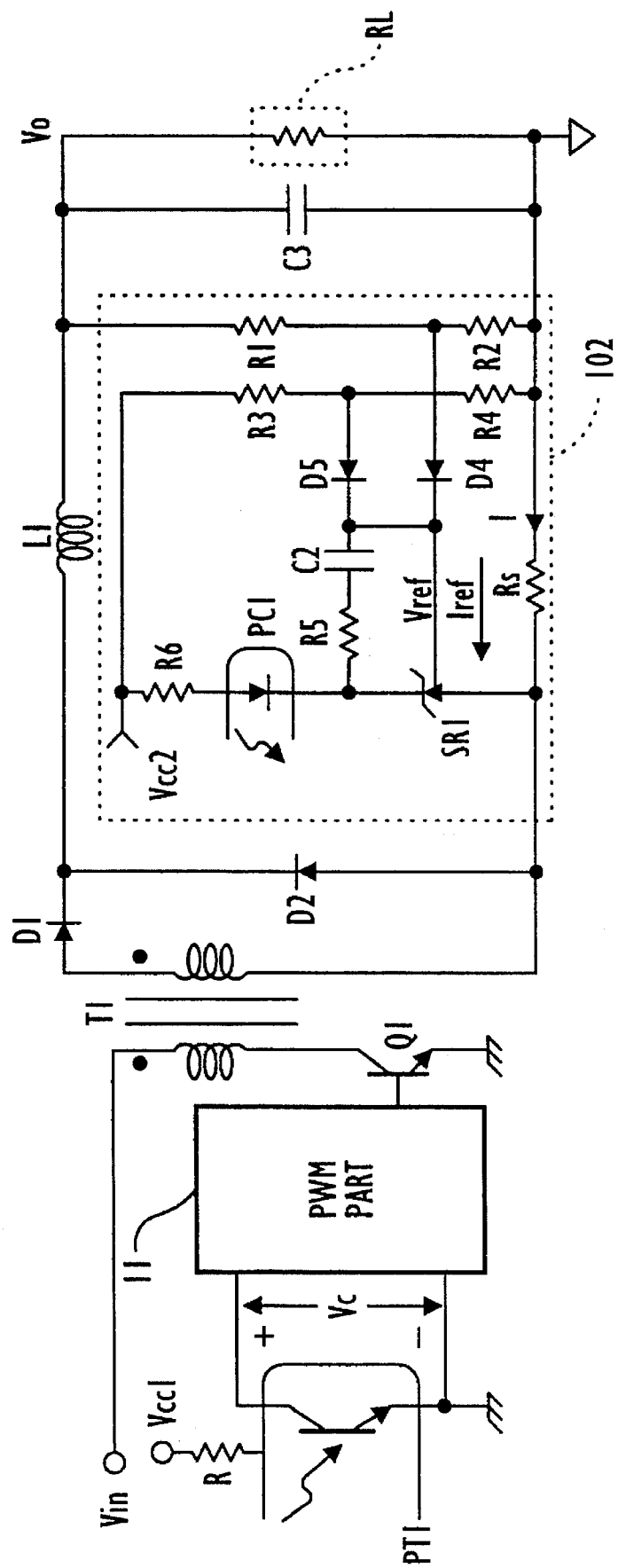
FIG. 2 is a circuit diagram illustrating an embodiment of an SMPS according to the present invention.

FIG. 2 is a circuit diagram of one preferred embodiment of the switch-mode power supply circuit with control of output supply voltage and overcurrent according to the present invention.

Referring to FIG. 2, a second supply voltage conversion section comprises a transformer T1 wherein an AC power supply is applied to its primary winding, diodes D1 and D2 which rectify the supply voltage developed in the secondary winding of the transformer T1, a coil L1 and a capacitor C3 which supplies a smoothed DC output supply voltage Vo to a load RL.

A control section 102 prevents overcurrent by generating constant voltage by voltage after feeding back a control signal for control of the output supply voltage and overcurrent to a phototransistor PT1. The control section 102 dividing resistors R1 and R2 connected between the smoothing coil L1 and the load RL to divide the output supply voltage, a diode D4 which is turned on or off according to the voltage divided by the resistors R1 and R2, resistors R3 and R4 which divide the output supply voltage according to an internal power supply Vcc2, a diode D5 which is turned on or off according to the voltage divided by the resistors R3 and R4, each output terminal of the diodes D4 and D5 being commonly connected to perform OR function, a shunt regulator SR1 which stabilizes the output supply voltage with the reference voltage terminal Vref thereof connected to the output terminals of the diodes D4 and D5, and a photo diode of a photocoupler PC1 which feeds back a control signal for control of the output supply voltage and overcurrent to the phototransistor provided at the primary winding side of the transformer T1 according to the output supply voltage provided through a resistor R6 and according to the on/off operation of the shunt regulator SR1. The Phototransistor PT1 is supplied with an internal driving power supply Vcc1 through a load resistor R.

A sensing resistor Rs for sensing the output supply current is connected between the anode of the shunt regulator SR1 and the resistor R4. The shunt regulator SR1 has a regulated voltage source therein, and is capable of varying the output supply voltage in the range of 2.5 V to 36 V using the resistors R1, R2, R3 and R4. The output voltage can be varied by adjusting the resistance values of the resistors R1 and R2, while the overcurrent operation point for the output supply current can be varied by adjusting the resistance values of the resistors R3 and R4. The response speed of the output supply voltage and the output supply current can be varied by adjusting the combined resistance ratio of the resistors R1 to R4.

The primary winding of the transformer T1 is connected to a first supply voltage conversion section which comprises a phototransistor FT1 which is turned on by the light generated by the photo diode of the photocoupler PC1, a PWM section 11 whose output duty cycle which is connected to the phototransistor PT1 and is controlled according to the output of the phototransistor PT1, and a switching transistor Q1 which controls applying of the input supply voltage to the primary winding of the tranformer T1 according to the output duty cycle of the PWM section 11.

The operation of the present invention as constructed above will now be described.

The voltage induced in the secondary winding of the transormer T1 is rectified by the diodes D1 and D2, and is smoothed by a coil L1 and the capacitor C3, thereby being supplied to the load R as a DC output supply voltage Vo. The output supply voltage Vo is divided by the resistors R1 and R2, and the divided voltage is supplied to the reference voltage terminal of the shunt regulator SR1 through the turned-on diode D4. The divided voltage is then compared with the internal reference voltage of the shunt regulator SR1.

At this time, if the output supply current I flowing through the sensing resistor Rs is less than the reference current Iref, i.e., the maximum rated output current of the present SMPS circuit, the output supply current I represents a normal operation state and the diode D5 is turned off. Accordingly, the control section 102 exclusively functions to control the output supply voltage.

In other words, when the output supply voltage Vo becomes relatively low, the voltage Vref divided by the resistors R1 and R2 becomes lower than the internal reference voltage (2.5 V) of the shunt regulator SR1, and the shunt regulator SR1 is thereby turned off, causing reduction of the current flowing through the photodiode of the photocoupler PC1.

The impedance of the phototransistor PT1 provided at the primary winding side of the transformer T1 accordingly increases, thereby increasing the voltage Vc supplied to the PWM section 11. This results in increase of the output duty cycle of the PWM section 11 as well as increase of on-time of the switching transistor Q1, thereby increasing the output supply voltage Vo.

Meanwhile, if the output supply voltage Vo is relatively high, the voltage Vref divided by the resistors R1 and R2 becomes higher than that of the internal reference voltage (2.5 V) of the shunt regulator SR1, and the shunt regulator is turned on, resulting in increase of the current flowing through the photodiode PC1.

The impedance of the phototransistor PT1 accordingly decreases, thereby decreasing the voltage Vc supplied to the PWM section 11. This results in decrease of the output duty cycle of the PWM section 11 as well as decrease of on-time of the transistor Q1, thereby lowering the output supply voltage Vo.

As a result, the voltage Vref divided by the resistors R1 and R2 according to the above-described operation characteristics becomes equated with the reference voltage (2.5 V), thereby the output supply voltage being stabilized.

If the output supply current I flowing through the sensing resistor Rs becomes higher than the reference current Iref, it represents an overcurrent state.

The voltage induced in the secondary winding of the transformer T1 is rectified by the diode D3, and is smoothed by the capacitor C1, being output through the regulator Zener diode ZD1. The supply voltage at the Zener diode ZD1 is divided by the resistors R3 and R4 and the divided voltage is supplied to the reference voltage terminal of the shunt regulator SR1 through the diode D5.

If the output supply current I flowing through the sensing resistor Rs becomes overcurrent, the reference voltage Vref becomes higher than 2.5 V, and the shunt regulator SR1 is thereby turned on. The current flowing through the photodiode of the photocoupler PC1 becomes greater.

The impedance of the phototransistor PT1 provided at the primary winding side of the transformer T1 accordingly becomes lower, causing decrease of the voltage Vc supplied to the PWM section 11. This results in decrease of the output duty cycle of the PWM section 11 as well as the output supply voltage Vo and the output supply current, thereby preventing overcurrent.

The output supply voltage can be varied by adjusting the resistance value of the resistors R1 and R2, while the overcurrent operation point for the output supply current can be varied by adjusting the resistance values of the resistors R3 and R4.

The response speed of the output supply voltage and current can be varied by adjusting the combined resistance ratio of the resistors R1 to R4 along with the resistor R5 and the capacitor. The resistor R5 and the capacitor C2 function to improve the response speed of the shunt regulator SR1.

The control of the output supply voltage and prevention of the overcurrent can be achieved by the OR function performed by the diodes D4 and D5 whose output terminals are commonly connected to the reference voltage terminal of the shunt regulator SR1.

Figure 3:
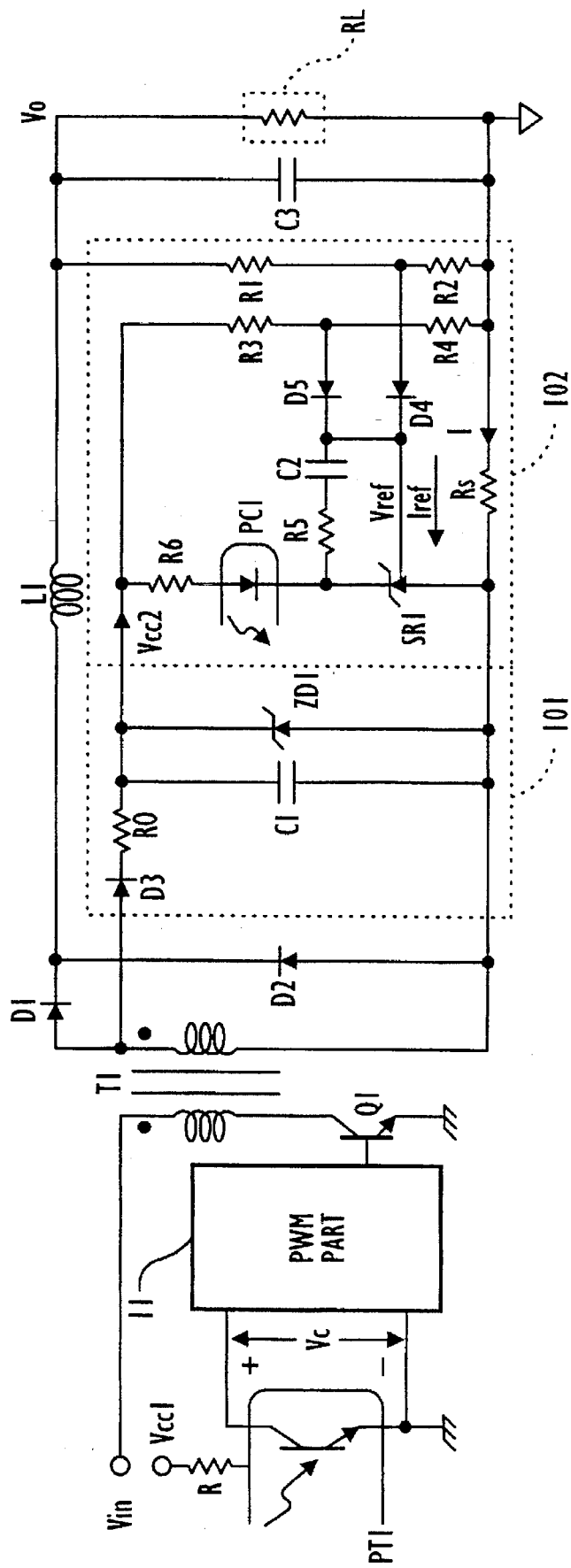
FIG. 3 is a circuit diagram illustrating another embodiment of an SMPS according to the present invention.

FIG. 3 is a circuit diagram of another preferred embodiment of the switch-mode power supply circuit with control of output supply voltage and prevention of overcurrent according to the present invention.

The construction of the embodiment in FIG. 3 is similar to that of FIG. 2. The only difference is that the embodiment of FIG. 3 additionally has a supply voltage generating section 101 which is provided between the secondary winding of the transformer T1 and the control section 102. Accordingly, the following does not include the operational description of the parts other than the supply voltage generating section 101 of FIG. 3.

The supply voltage generating section 101 comprises a diode D3 which rectifies the voltage induced in the secondary winding of the transformer T1, a smoothing capacitor C1, and a voltage regulator Zener diode ZD1.

However, the voltage regulator Zener diode ZD1 is not indispensable.

A slightly more complex construction of FIG. 3 than that of FIG. 2 enables the construction of FIG. 3 to effectively and precisely perform control of the output duty cycle and prevention of overcurrent with its stable power supply to the control section 102.

In the switch mode power supply according to the present invention as described above, the control of the output supply voltage and prevention of overcurrent can be achieved by a single circuit using one photocoupler, and this results in simplification of the circuit construction as well as reduction of the size and manufacturing cost.

Also, according to the present invention, it is not required to employ an additional winding of the transformer.

It is possible in the switch-mode power supply according to the present invention, which has functions of controlling the output supply voltage and preventing overcurrent, to replace a shunt regulator having a function of preventing the overcurrent with a switching element having other regulating means. Accordingly, it is possible to carry out varied embodiments of the above description within the scope of the technical concept of the present invention.

What is claimed is:

1. A switch-mode power supply having a switch-mode supply voltage conversion means for converting an input AC supply voltage into a DC supply voltage, the power supply comprising:

a first supply voltage conversion means for controlling said input AC supply voltage applied to said switch-mode supply voltage conversion means;

a second supply voltage conversion means for providing a converted supply voltage corresponding to a signal applied by said first supply voltage conversion means; and a control means having a sensing means, coupled to said second supply voltage conversion means, for simultaneously sensing a converted output supply voltage level from said second supply voltage conversion means and an output supply current according to said converted output supply voltage level, said control means sensing said converted output supply voltage and said output supply current simultaneously or separately and providing a control signal corresponding to said converted output supply voltage and said output supply current, said control means being coupled to said first supply voltage conversion means and controlling said first supply voltage conversion means according to said control signal.

2. A switch-mode power supply having a switch-mode supply voltage conversion means for converting an input AC supply voltage into a DC supply voltage, the power supply comprising:

a first supply voltage conversion means for controlling applying of said input AC supply voltage to said switch-mode supply voltage conversion means;

a second supply voltage conversion means for providing a converted supply voltage corresponding to a signal applied by said first supply voltage conversion means;

a supply voltage generating means, coupled to said second supply voltage conversion means, for providing a stabilized driving supply voltage to said control means by rectifying and smoothing said converted supply voltage provided from said second supply voltage conversion means; and a control means operated by said driving supply voltage provided from said supply voltage generating means, and having a sensing means, coupled to said second supply voltage conversion means, for simultaneously sensing a converted output supply voltage level from said second supply voltage conversion means and an output supply current according to said converted output supply voltage level, said control means sensing said converted output supply voltage and said output supply current simultaneously or separately and providing a control signal corresponding to said converted output supply voltage and said output supply current, said control means being coupled to said first supply voltage conversion means and controlling said first supply voltage conversion means according to said control signal.

3. A switch-mode power supply as claimed in claim 2, wherein said control means comprises:

a first dividing means for dividing said converted supply voltage from said second supply voltage conversion means;

a second dividing means for dividing said driving supply voltage from said supply voltage generating means;

first and second switching elements being controlled to be turned on or off according to divided supply voltages provided from said first and second dividing means, respectively;

a third switching element being controlled to be turned on or off according to outputs of said first and second switching elements; and a photocoupler for controlling an output duty cycle of said first supply voltage conversion means under the control of said third switching element.

4. A switch-mode power supply as claimed in claim 3, wherein said third switching element is a shunt regulator.

5. A switch-mode power supply as claimed in claim 2, wherein said control means further comprises a registor for sensing said output supply current provided from said second supply voltage conversion means to control said divided supply voltage provided from said second dividing means to said second switching element according to said sensed output supply current.

6. A switch-mode power supply as claimed in claim 2, wherein said converted supply voltage from said second supply voltage conversion means is varied by adjusting a division ratio of said first dividing means.

7. A switch-mode power supply as claimed in claim 2, wherein an overcurrent operation point of said output supply current from said second supply voltage conversion means is varied by adjusting a division ratio of said second dividing means.

8. A switch-mode power supply as claimed in claim 2, wherein a response speed of said converted output supply voltage and said output supply current from said second supply voltage conversion means is varied by adjusting a combined division ratio of said first and second dividing means.

9. A switch-mode power supply for converting an input AC supply voltage into a DC supply voltage, the power supply comprising:

a first voltage conversion circuit including a pulse width modulation (PWM) section coupled to a first phototransistor for varying the output duty cycle of the PWM section and a switching transistor coupled to the output of the PWM section;

a second voltage conversion circuit including a transformer coupled to an output of said switching transistor which applies an AC current to a primary winding of said transformer, said transformer having a secondary winding coupled to a first diode, said first diode having its output coupled to a second diode and a coil, said coil coupled to a capacitor and to a load; and a control circuit having an output supply voltage applied thereto from an internal power supply, a first and a second resistor for dividing the output supply voltage, a third diode having an input to which the divided voltage from the first and second resistors is applied and an output, a third and a fourth resistor for dividing the output supply voltage according to the output supply voltage supplied from the internal power supply, a fourth diode having an input to which the divided voltage from the third and fourth resistors is applied and an output, a shunt regulator connected to the outputs of the third and fourth diodes, an output of said shunt regulator coupled to a second phototransistor for sending a control signal to the first phototransistor according to an output supply voltage from the shunt regulator.

* * * * *